United States Patent
Lotspiech et al.

(10) Patent No.: US 7,539,307 B2
(45) Date of Patent: May 26, 2009

(54) SYSTEM, METHOD, AND SERVICE FOR DELIVERING ENHANCED MULTIMEDIA CONTENT ON PHYSICAL MEDIA

(75) Inventors: Jeffrey B. Lotspiech, Henderson, NV (US); Florian Pestoni, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 10/723,403

(22) Filed: Nov. 26, 2003

(65) Prior Publication Data

US 2005/0111663 A1    May 26, 2005

(51) Int. Cl.
*H04N 7/167* (2006.01)
(52) U.S. Cl. .................................................. 380/239
(58) Field of Classification Search ................ 380/239
See application file for complete search history.

(56) References Cited

U.S. PATENT DOCUMENTS

| | | | | |
|---|---|---|---|---|
| 7,310,732 | B2 * | 12/2007 | Matsuyama et al. | 713/176 |
| 2002/0116919 | A1 * | 8/2002 | Rosel et al. | 60/285 |
| 2002/0136411 | A1 | 9/2002 | Ishiguro et al. | 380/278 |
| 2002/0184259 | A1 * | 12/2002 | Akishita et al. | 707/501.1 |
| 2005/0100161 | A1 * | 5/2005 | Husemann et al. | 380/200 |

OTHER PUBLICATIONS

Pestoni's IMA talk titled "Content Protection for Recordable Media" on Feb. 16, 2001.*
EICTA "Content Protection Technologies," available on Nov. 26, 2003, at: www.eicta.org/levies/docs/Content%20Protection%20Techs.pdf.
Chagu@lg-elite.com, LG, Dec. 20, 2000.
"CPRM Content Protection for Recordable Media," Oct. 11, 2000.
"Broadcast Encryption's Bright Future," IEEE, Aug. 2002.

(Continued)

*Primary Examiner*—Kambiz Zand
*Assistant Examiner*—Harris C Wang
(74) *Attorney, Agent, or Firm*—Cantor Colburn LLP; Leonard Guzman

(57) ABSTRACT

Enhanced multimedia content on physical media interacts with the user through a media player and the Internet. Enhanced multimedia utilizes IDs for pieces of content on the media and a media key block. On the enhanced media is a file with a list of URLs. As the enhanced media plays a section requiring a set of keys for decryption, the media player accesses the URL for that section and obtains the decryption key. The decryption key may be purchased or provided for free. Secure encryption and transmission of these keys is accomplished by broadcast encryption using a media key block. Each media has a unique set of keys that allow the media player to process the media key block; however, each media follows a unique path through the media key block. All legitimate media players obtain the media key; circumvention devices cannot decipher the media key block.

8 Claims, 13 Drawing Sheets

OTHER PUBLICATIONS

"5C Digital Transmission Content Protection," White Paper, Revision 1.0, Jul. 14, 1998.

"Class EncryptionPipe," available on Sep. 15, 2003, at: http://www.brendonwilson.com/projects/hushmail/api/com/hushmail/pipe/EncryptionPipe . . . .

EP 1221782: "Information Processing Device And Processing Method," available on Sep. 8, 2003, at: http://swpat.ffii.org/pikta/txt/ep/12221/782/.

Content Protection for Recordable Media, available, on Sep. 8, 2003, at: http://www.cas.mcmaster.ca/~wmfarmer/SE-4C03-02/projects/student_work/project/liangt....

XML Encryption Syntax and Processing, Version 1.0, Dec. 15, 2000, available at: http://lists.w3.org/Archives/Public/xml-encryption/2000Dec/att-0024/01-XMLEncryption_. . . .

Digital Content Protection, Part III, available, on Sep. 8, 2003, at: http://www.extremetech.com/article2/0,3973,1230031,00.asp.

* cited by examiner

SYSTEM, METHOD, AND SERVICE FOR DELIVERING ENHANCED MULTIMEDIA CONTENT ON PHYSICAL MEDIA

FIELD OF THE INVENTION

The present invention generally relates to physical storage or memory media. In particular, the present invention pertains to a media comprising enhanced portions of content enabled for use by an encrypted key provided by a third party such as a web service provider.

BACKGROUND OF THE INVENTION

The entertainment industry is in the midst of a digital revolution. Music, television, and movies are increasingly becoming digital, offering new advantages to the consumer in quality and flexibility. At the same time, since digital data can be perfectly and quickly copied, the digital revolution also comprises a threat. If consumers may freely copy entertainment content and offer that content on the Internet, the market for entertainment content would evaporate.

Another issue faced by content owners is fraudulent manufacturing of media such as DVDs. DVDs are typically manufactured by replicators. On occasion, replicators producing these DVDs do overruns without telling the content owner, for example, a movie studio. After replicating the DVDs for the movie studio, the replicator runs an additional batch for sale on the black market. Movie studios at present have little control over the replicators. However, this source of fraud may be minimized if the DVD were encrypted in such a way that authorization was required before the DVD is played.

One conventional content encryption method encrypts the content on pre-recorded media. The content is enabled for play after the user purchases through an Internet transaction the right to play or otherwise use the content. This approach to content protection has been implemented in several conventional content protection schemes. IBM has implemented a method in which a CD-ROM disc was recorded with encrypted software for many different applications, which is referred to as CD Showcase. The CD-ROM disc was given away for free by mass mailings or at trade shows. After paying a fee, the user would be given a decryption key that would allow them to decrypt a particular application and install it on the system. The disc often contained free demonstration versions of the software that the user may preview, with the intent that the user might decide to purchase the fully featured version.

Another conventional content encryption method was used as a method for renting compact disks (i.e., CD or DVD) movies, implemented by the Divx Company. In one example, the DVD movies were encrypted on the disc using the triple-DES cipher. When the user played a movie, the DVD player may decrypt the content without external authorization from the rental company. However, the DVD player would periodically call a processing center and report the movies it had played.

The DVD player would not play movies if it was unable to call the processing center. The discs were sold for a rental fee and comprised one 48-hour viewing period. If the disc was played after the initial viewing period or if it were played on a DVD player other than the one authorized, these additional viewings would be charged to the user. This approach using content encryption method provided several advantages: the user did not have to return the "rental" disc after playing, and the period of free viewing did not start until the user played the disc. Consequently, the user may "rent" the disc at his convenience, i.e., on a Tuesday for later playing on Saturday night. However, this approach required a specialized DVD player that can call a specific processing system.

One of the shortcomings of both of these content encryption methods was that the cryptographic keys used were essentially global secrets. However, global secrets often do not remain secret very long. In one conventional application of the content encryption method, the global secret may be updated periodically for new discs as the DVD players connected to the processing center. However, the old discs were still compromised.

One approach to protecting copyrighted content on physical storage or memory media is to have the user connect to a web service provided on the Internet to authorize or purchase the content. A conventional approach for this connection is a public/private key system. A web service provider and the DVD player each have a public key. The DVD player and the web service provider handshake on a public/private key to verify the web service provider and the DVD player. The key would be delivered based on the handshake, establishing a secret key. However, the public key calculation is a complicated calculation and is difficult to perform. Furthermore, the handshake requires an active online connection, which may be inconvenient for the user.

What is needed is a system, a service, a computer program product, and an associated method for a content encryption method for pre-recorded physical media that is secure, is easily implemented, may be authorized by a transaction such as an Internet transaction, and can be allowed a deferred interaction with that processing center. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for delivering enhanced multimedia content on physical media. The physical media comprises any portable memory or storage medium such as, for example, compact discs (CDs), digital video discs (DVDs), flash memory, flash cards, etc. For exemplary purposes, the physical memory is referenced as a DVD.

The present system utilizes a unique ID, a media key block, and a set of special files burned on each DVD. Additional IDs may be provided for pieces of content on the DVD. Physical media with these IDs, media key block, and special files are referenced as enhanced media because of its ability to interact with the user through a media player and the Internet. On the enhanced media is a file with a list of uniform resource locators (URLs) for web sites on the WWW. As the enhanced media plays a section requiring a set of keys for decryption, the media player accesses the URL for that section and obtains the decryption key.

The DVD player playing the enhanced media connects to the Internet by means of a dial-up modem, cable modem, DSL, etc. Each DVD has a media key block. The DVD player connects to the uniform resource locator (URL) provided on the DVD in one of the special files. The present system does not use a "global secret" for encryption or perform a public/private handshake to establish a secret ID enabling the DVD player to play the content. Rather, the present system uses a recently developed encryption technique, broadcast encryption.

Fundamentally, broadcast encryption is based on a block of data on the media called a media key block. Each DVD player has a unique set of keys that allow the DVD player to process the media key block; however, each player follows a unique path through the media key block. All legitimate players end up with the result, the media key. However, if circumvention devices appear, newly released discs can be manufactured so that the circumvention devices, following their particular paths through the media key block, get the wrong answer. All innocent devices continue to correctly calculate the media key. Consequently, only the circumvention devices are excluded from the system.

The present system uses the media key block on the physical media as an aid to deliver content keys across the Internet, thereby avoiding a single global secret. A web service provider or other processing center delivers an encrypted content key across the Internet. The media key protects this content key. In an embodiment, the media key is combined with the volume ID using a cryptographic hash, providing a disc unique key. The disc unique key is then encrypted in the various title keys on the disc, one for each title. In another embodiment, the disc unique key is simply the media key.

The special files on the disc provide, for example, a URL for the web service provider. The integrity of this URL is very important. If a hacker or adversary corrupts the URL, the user can be sent to an alternate URL not representing the web service provider. Without adequate security or verification techniques for the DVD, hackers or adversaries might set up URLs for alternate web sites to obtain credit card information from the consumers. To ensure the integrity of the special files, the special files are cryptographically hashed and the results are XORed with the Internet content key before the content unique key encrypts the content key. The result is burned on the DVD.

The sequence and type of the calculations are somewhat arbitrary. For example, the disc unique key calculation might comprise the hash of the special files, or the content ID may be XORed with Internet content key. Likewise, XORs may be replaced by other operations such as addition or subtraction, without changing the net effect. Variations in the sequence and type of the calculations may be made as long as the end user cannot tamper with the content ID and the special files on the disc without disrupting the calculation.

The present system introduces improved cryptography in enhanced media, eliminating the need for a single global secret or public/private key exchanges. Enhanced media in the form of a DVD video might be used in a variety of business and marketing scenarios. For example, enhanced media might be used in a video rental format, where the user obtains a content-protected movie on DVD for free or a fee. When played on the user's DVD, the user's DVD player contacts a web service provider and the movie is enabled for a period of time specified by the web service provider. The enabling transaction may or may not involve a purchase. Additional features may be placed on the movie DVD that may be enabled for additional fees, for example.

As a promotional event, a DVD video movie might be given away free in the theater after a movie, for example. When played in the user's DVD player, the DVD player contacts a web service provider and the user may purchase the contents on the DVD. A conventional DVD might contain optional content that may be purchased through the web service provider, for example, a "director's cut" with additional scenes and director's comments already encrypted on the disc, but only available to the user for an additional fee.

Even if the bonus content is free, there is an advantage to the studios to ask the consumers to get it through the studio's Web site. This allows the studios to identify their actual consumers, to make them special offers, and to form electronic communities around certain movies.

Using a mechanism available in a DVD player, the enhanced media can offer to the user through the web service provider physical merchandise such as logo t-shirts, action figures, or other spin-off merchandise associated with, for example, a movie. As users enable certain features of a DVD through the web service provider either for free or for purchase, the content owners are able to monitor the actual usage of different features on the DVD. Content creators may then use this information to design future productions.

The present system is applicable to other types of content such as audio, gaming, and computer software, with corresponding similar applications. A DVD might contain software or a game console given away by a software manufacturer with demonstration models in addition to the full-featured software. The user may connect with the web service provider to purchase the full-featured software after trying the demonstration version. In addition, a game might contain extra features that are enabled after the user completes a transaction with the web service provider.

With unique IDs and a media key block on each DVD, content owners can verify each piece of content when the user connects to the web service provider. This feature allows content owners a method for combating fraud committed by replicators. As users connect with the web service provider to obtain features offered by the DVD, the content owner would know whether a replicator created extra copies because, for example, DVD IDs would be duplicated. The content owners would then have proof of the fraud and be able to better control production of the DVDs.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

HTTPS (HyperText Transport Protocol Secure): Protocol for accessing a secure Web server.

Internet: A collection of interconnected public and private computer networks that are linked together with routers by a set of standard protocols to form a global, distributed network.

World Wide Web (WWW, also Web): An Internet client—server hypertext distributed information retrieval system.

Content: copyrighted media such as music or movies presented in a digital format on electronic devices.

Figure 1:
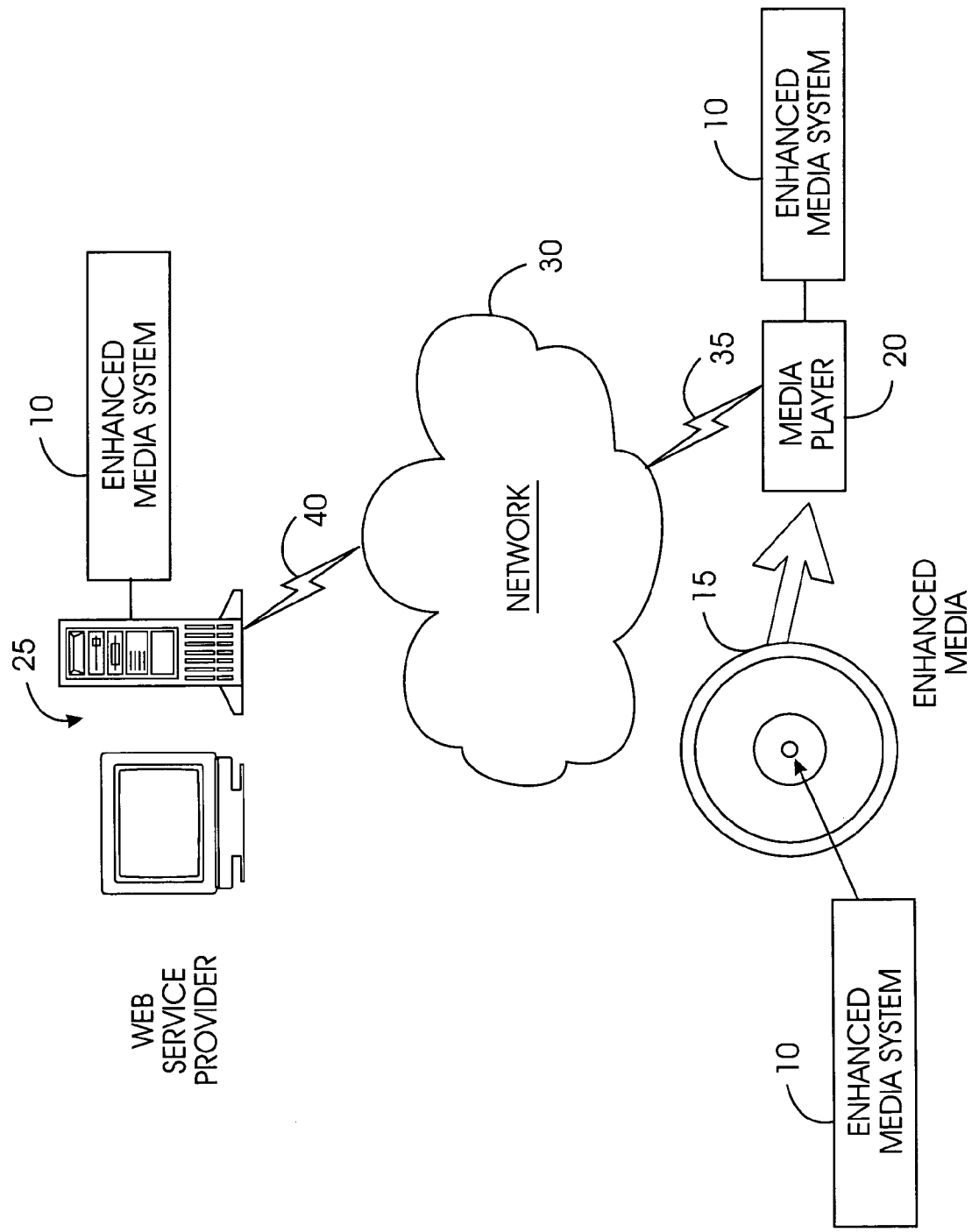
FIG. 1 is a schematic illustration of an exemplary operating environment in which an enhanced media system of the present invention can be used.

FIG. 1 portrays an exemplary overall environment in which a system, method, and service for delivering enhanced multimedia content on physical media according to the present invention may be used. An enhanced media system 10 comprises a software programming code or a computer program product that is typically embedded within, or installed on an enhanced media 15, a media player 20 and a web service provider 25. Alternatively, enhanced media system 10 can be saved on a suitable memory or storage medium such as a diskette, a CD, a DVD, a hard drive, or like devices.

A media player 20 can access a web service provider 25 through a network 30. The media player 20 comprises software that allows the media player 20 to interface securely with the web service provider 25. The media player 20 comprises any compliant module that can verify the physical presence of media such as, for example, a disc. A compliant module is one that follows the usage rules that are cryptographically bound to that enhanced media 15. For example, a compliant recorder would not record content encoded "do not copy". The media player 20 is connected to network 30 via a communications link 35 such as telephone, cable DSL, satellite link, etc. The web service-provider is connected to the Internet through a communications link 40.

An enhanced media 15 may be played on the media player 20. The enhanced media 15 comprises enhanced functions that are extra functions available through Internet connectivity. These enhanced functions may be separately priced, or may be included in the original price of the disc. Some of the enhanced functions may require the media player 20 to participate in an interaction with the web service provider 25. The media player 20 can simply enable other enhanced functions.

Enhanced functions that may require the media player 20 to participate in an interaction with the web service provider 25 comprise:
  enabling premium features, such as a soundtrack containing the director's comments,
  having a free promotional disc with optional paid content,
  offering a disposable rental disc that the user does not have to return after viewing,
  providing usage counts of various features for feedback to the content creators, and
  providing a path for the user to pay for physical goods associated with the content (such logo merchandise).

Figure 2:
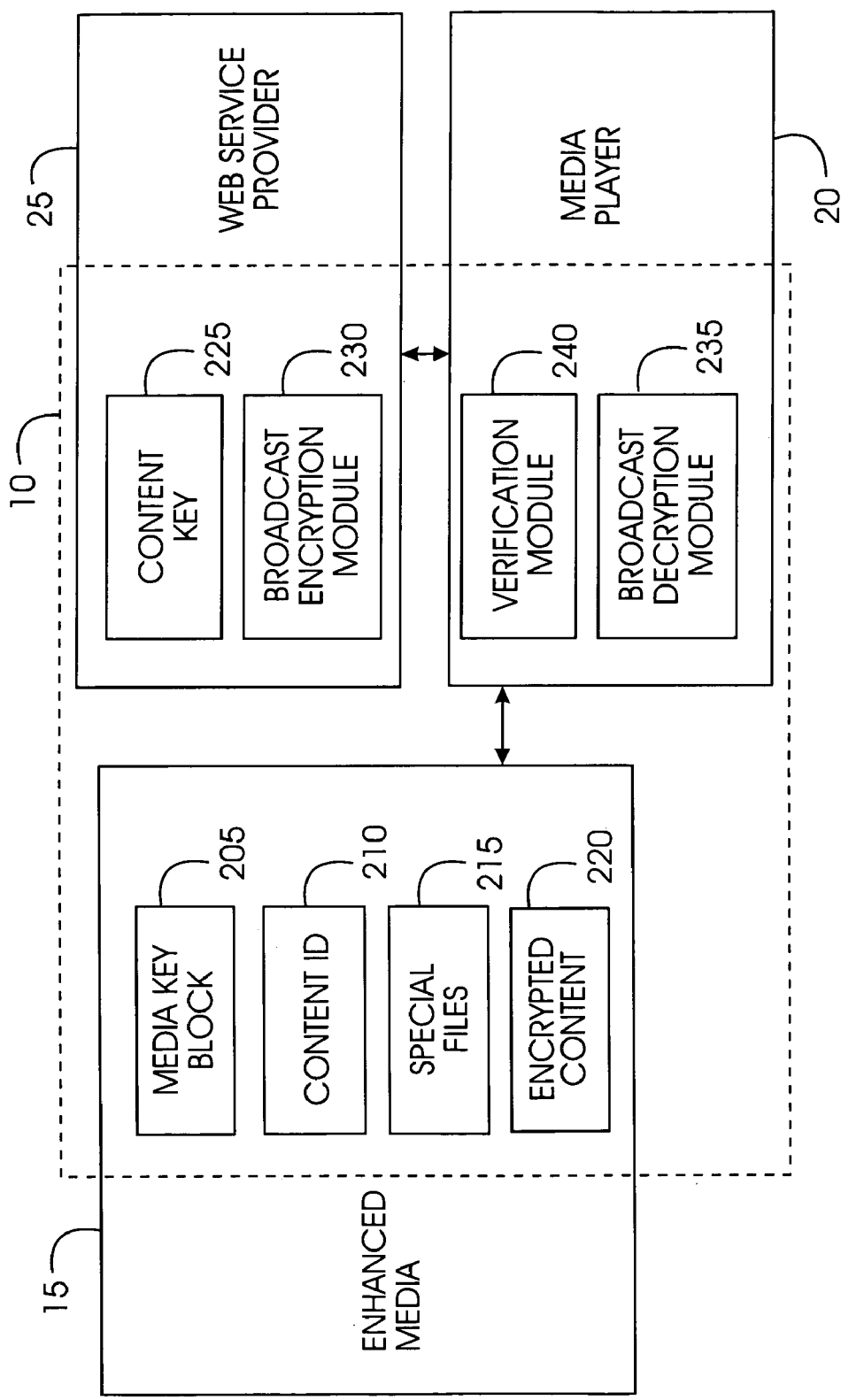
FIG. 2 is a block diagram of the high-level architecture of the enhanced media system of FIG. 1.

The block diagram of FIG. 2 illustrates a high-level architecture for the enhanced media system. The enhanced media system 10 comprises a media key block 205, a content ID 210, a set of special files 215, and an encrypted content 220 on the enhanced media 15. The web service provider 25 comprises a content key 225 and a broadcast encryption module 230. The media player 20 comprises a broadcast decryption module 235 and a verification module 240.

To play encrypted content 220, the media player 20 contacts the web service provider 25 to obtain the content key 225. The web service provider 25 encrypts the content key 225 using a disc unique key provided by the content creator. This disc unique key is derived from the media key in the media key block 205. The web service provider 25 may encrypt the content key itself, or it may be delivered already encrypted by the content creator. The web service provider 25 delivers the encrypted content 220 key 225 to the media player 20. The broadcast decryption module 235 of the media player 20 decrypts the encrypted content key 225 using the media key; this decrypted content key 225 allows the media player to play encrypted content 220.

The special files 215 comprise a phone.list file, a root.certificate file, and an enhanced.keys file. The phone.list file is a list of dial-up service numbers with which the particular content owner has contracted to provide Internet connection points for modem-equipped media players 20.

The root.certificate file is a public key certificate, for example, it may be an X.509 certificate as defined in Internet standard RFC 2459. The public key in the root.certificate file is used by the media player 20 to check the signature in the site certificate of the web service provider 25 during, for example, the HTTPS protocol. The root.certificate file informs the media player 20 which public key verifies the web service provider 25. The enhanced.keys file comprises information on how the media player 20 obtains additional keys to play encrypted content 220.

Media player 20 is required to have an Internet connection. Any standard Internet connection is allowed, for example, Ethernet, IEEE 1394, wireless, or dial-up modem with PPP protocol, etc. In addition, each player may contain non-volatile storage to save, for example, the information for one or more user credit or debit cards. In an embodiment, the user is not required to enter credit/debit card information, but entering such may be offered during player set-up. A player equipped with a modem has non-volatile storage to save the user's phone number, i.e., the number to which the modem is connected. The end-user is given the opportunity to set this during player set-up.

The verification module 240 of the media player 20 calculates the hash of the content of each of the special files 215. These hashes are necessary to correctly decrypt the content keys 225. The actual keys are given to the player XORed with the hash, and then encrypted with the disc unique key $K_u$. In other words, the player can calculate the enhanced key $K_n$ from the encrypted data $D_n$ as follows:

$$K_n = AES\_D128(D_n, K_u) \oplus AES\_\text{hash}(\text{phone.list}) \oplus AES\_\text{hash}(\text{root.certificate})$$

$$\oplus AES\_\text{hash}(\text{enhanced.keys})$$

Keys in the enhanced.keys file of special files 215 comprise instant or deferred types. Instant keys can be further marked "cacheable". If an instant key is not in the cache of the media player 20, the media player 20 connects to the Internet to obtain the key from the web service provider 25 to continue playing the enhanced media 15. Obtaining the key may or may not require a purchase transaction.

Deferred keys allow the media player 20 to calculate the key without connecting to the web service provider 25. However, the media player 20 connects "at its convenience" to reset the "deferred" status. For example, the frequency of connection for deferred keys may be set by user preference during set-up of the media player 20. A media player 20 may elect to treat a deferred key as an instant key based on, for example, previously stored user preferences.

An exemplary form of the programming lines within the enhanced.keys file of special files 215 is as follows:

<url>[CACHEABLE|DEFERRABLE=<$D_n$>]
  [[<price><maximum price>]

Each line begins with the URL of the service center that provides the value of the key. The URLs begin https://. The optional price is "currency:nnn", for example, "USD1.00". If the price is offered in multiple currencies, they are listed in brackets, for example: "{USD2.00 YEN150}". The price field may be omitted if the key is free, or if the price of the key is revealed to the user when the media player 20 connects to the web service provider 25.

In an embodiment, the deferred key allows the user to play enhanced media 15 immediately with an implicit understanding that the user will pay for the viewing of enhanced media 15 later. The user is essentially operating a credit account with the content provider, managed by the web service provider 25. If the content owner charges for a deferred key, the enhanced.keys file may comprise the price for the deferred key. To protect the user, the price cannot be revealed later when the player connects. Otherwise, the user may be playing enhanced media 15 expecting one charge and find another when the media player 20 later connects to the web service provider 25.

In addition, deferred keys with a price have a maximum accumulated value, to protect the content provider. If the price of a deferred key plus the prices of all previous deferred keys whose URLs have the same domain name (even keys from other discs) exceeds a pre-determined maximum accumulated value, the media player 20 shall connect immediately to the web service provider 25 and process all the deferred transactions. This protects the content provider from a user that might accumulate a large debt that the content provider cannot collect. If the transactions are not successful for whatever reason, the media player 20 shall not process the current deferred key.

A key may be marked as "cacheable", "deferrable", or neither. Normally, the media player 20 shall remember a key until the media player 20 powers off, the enhanced media 15 is ejected, or the playing of the enhanced media 15 reaches a navigation branch requiring a user interaction. Functions of the media player 20 such as rewind, fast forward, and chapter skips shall not cause keys to be deleted. In addition, if the key is denoted as "cacheable", the media player 20 may optionally remember the key for a longer time. Remembering the key may make the user interactions run more smoothly. If the key is remembered, the media player 20 deletes the key at its convenience. If the key is stored encrypted in the cache using the broadcast decryption module 235, the cache need not have special security.

If the key is marked "deferrable", the string "$D_n$" is a readable hexadecimal string containing the encryption checked by the verification module 240. The media player 20 can calculate the key immediately from the $D_n$ string. The media player 20 shall then securely store the key number, price (if any), URL, title ID, and media ID for later communication to the web service provider 25. Deferred keys are not cached. If they are needed a second time, the media player 20 shall treat it as a new deferral instance. Based on the business model of the web service provider 25, the web service provider 25 may not charge for subsequent deferrals. However, the media player 20 assumes that the web service provider 25 does charge for subsequent deferrals when determining maximum deferred price has been reached.

The first time the media player 20 is asked to play a section that is encrypted with a priced key of any type, it stops, displays the price, and gets positive confirmation from the user before proceeding. This confirmation may ask the user to select the credit card, if more than one is stored in the media player 20. This confirmation may also comprise parental control interactions, if the media player 20 supports them and the user has configured them. If the price is offered in more than one currency, the media player 20 may ask the user to select, or it may automatically select one, for example, based on previously stored user preferences.

Figure 3A:
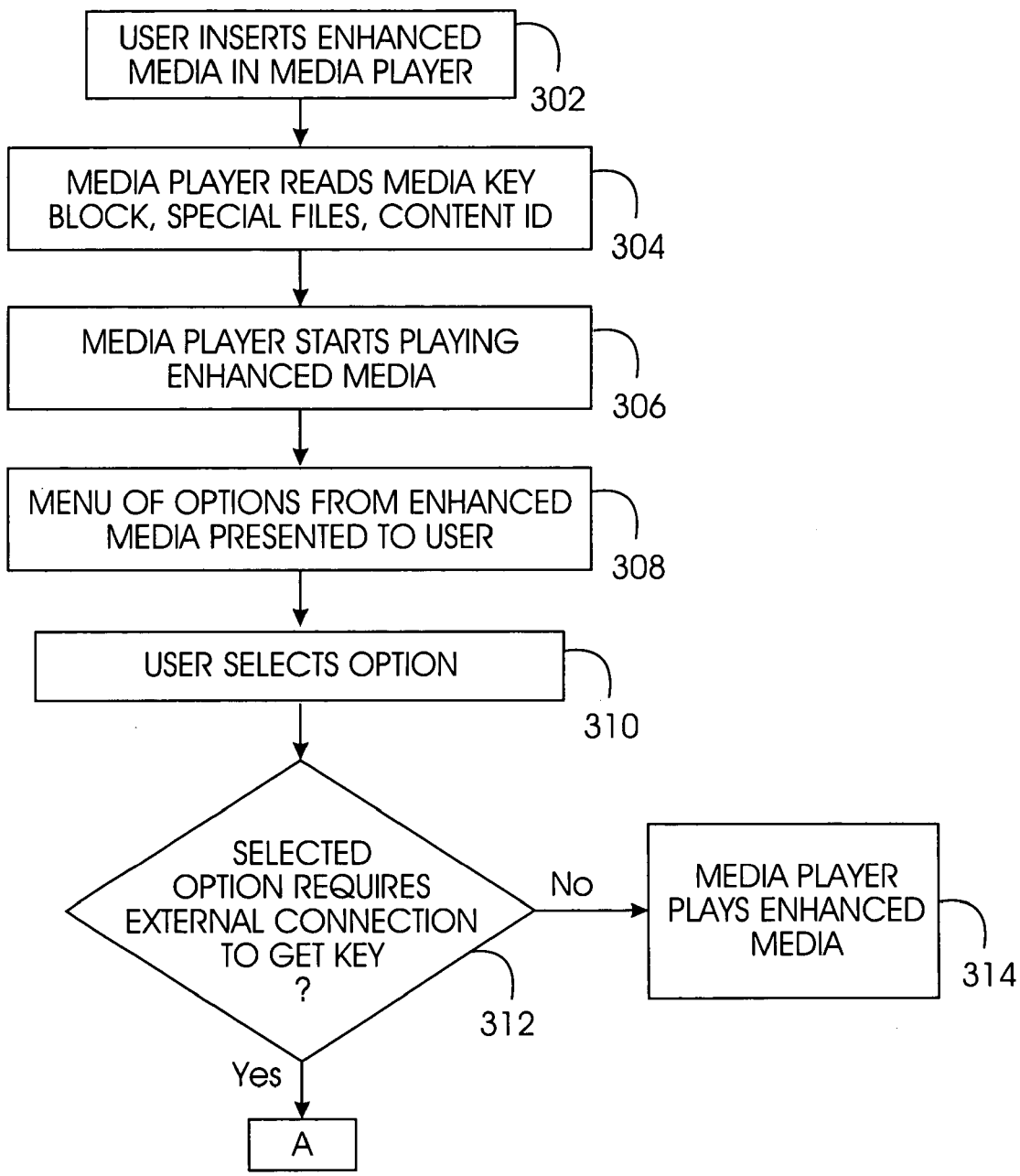
FIG. 3 is comprised of FIGS. 3A, 3B and 3C, and represents a process flow chart illustrating a method of operation of the enhanced media system of FIGS. 1 and 2.
Figure 3B:
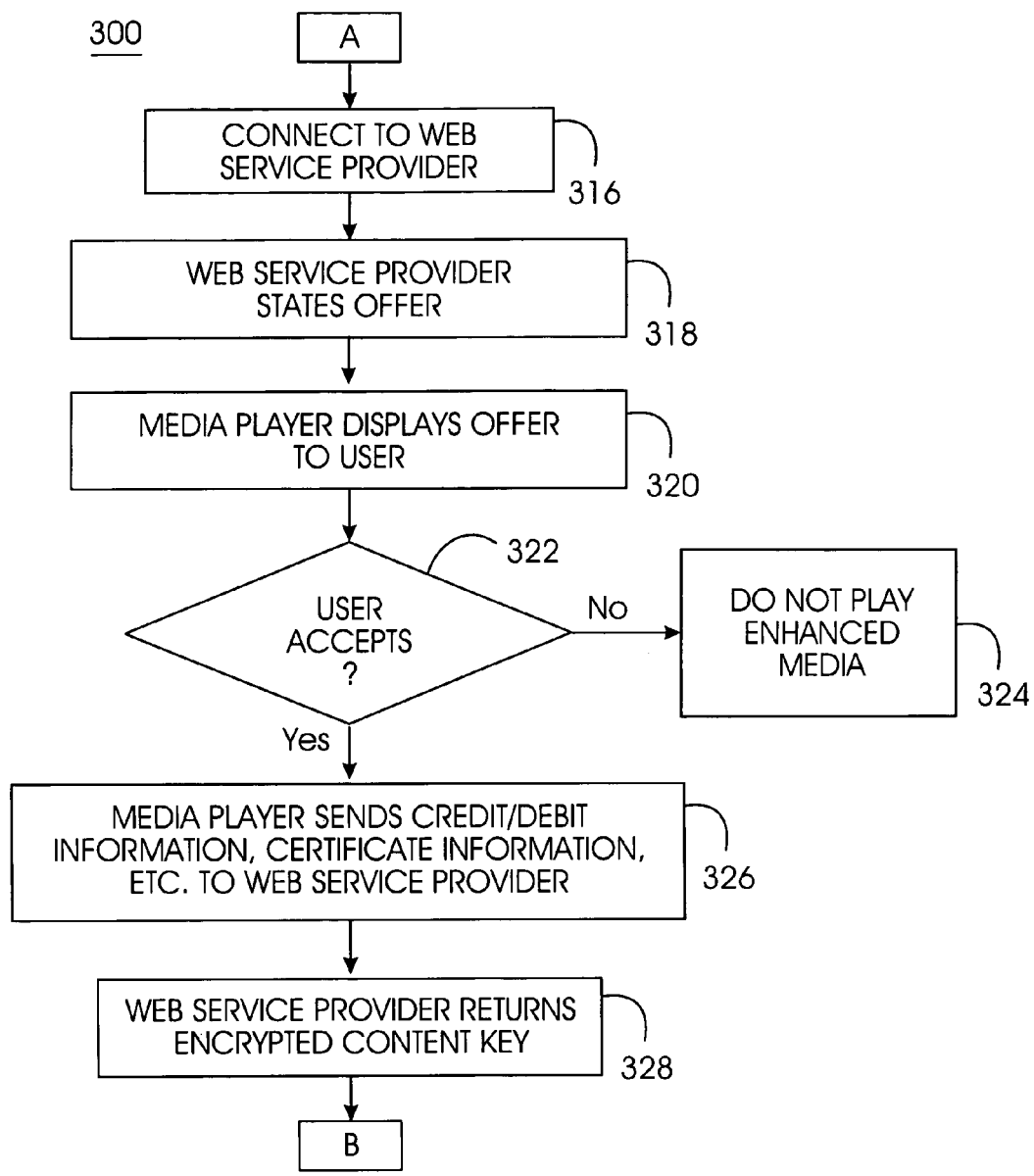
Figure 3C:
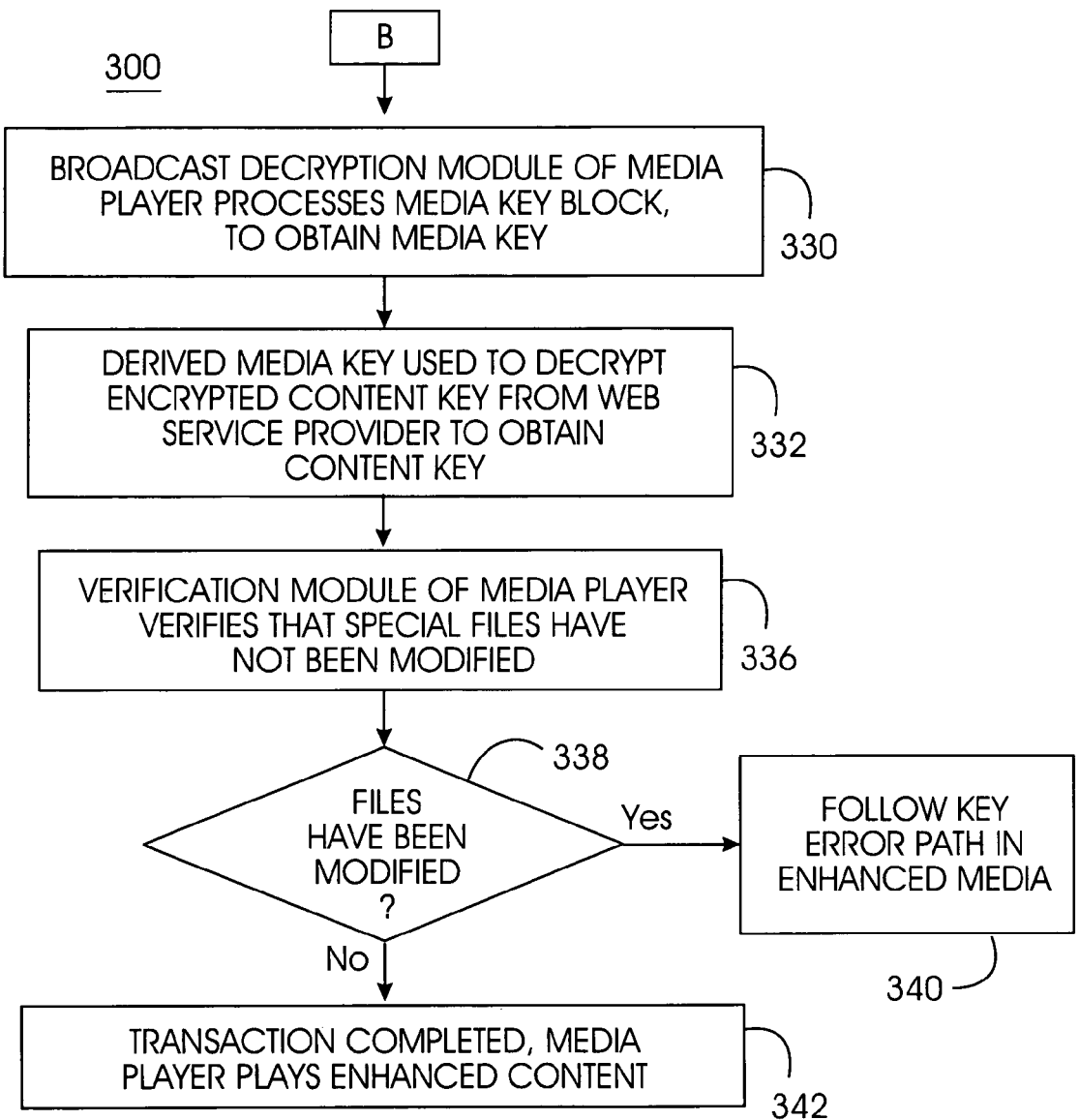

The process flow chart of FIG. 3 (FIGS. 3A, 3B, 3C) illustrates an exemplary method 300 for a user playing an enhanced media 15 on a media player 20. A user inserts the enhanced media 15 in the media player 20 at step 302. The media player 20 reads the media key block 205, special files 215, and content ID 210 at step 304. The media player 20 starts to play the enhanced media 15 at step 306.

The media player 20 presents a menu of options to the user from enhanced media 15 at step 308. There may be certain choices a user can select from the menu of the enhanced media 15 that involve a fee. For example, the enhanced media 15 might be a promotional movie disc given away for free. A movie trailer, a two-minute advertisement for the movie, might play for free for the user. If the user wishes to play the entire movie, he purchases the movie by selecting that option on the menu. The "purchase movie" option requires a transaction with the web service provider 25.

In another example, a user attends a movie at a theater and receives a copy of an enhanced DVD. The user may view the enhanced DVD and purchase the movie when it is released to DVD. The user does not have to go to a store and purchase the movie, and the motion picture studio improves sales for its DVD movie. The same concepts may be applied to software, games, etc.

The user selects an option from the menu at step 310. At decision step 312, the media player 20 determines whether the selected option requires external connection to the web service provider 25 to obtain a key. If a key is not required for the selected option, the media player 20 plays enhanced media 15 (step 314). If a key is required to play the enhanced content on the enhanced media 15, the media player 20 connects to the web service provider 25 at step 316 (FIG. 3B) based on a URL provided by the special files 215 in the enhanced media 15.

The web service provider 25 states an offer to the media player 20 at step 318; the offer comprises price, other fees, other features, offerings, etc. The enhancement requested by the user may be offered for free. The requirement by the content owner to obtain a key from the web service provider 25 to play this enhanced content on the enhanced media 15 may be used to gauge which features on the enhanced media 15 users are selecting. The content owner may then use this information when designing future products. Alternatively, the media player 20 may present the price or fee to the user on the menu, before connecting to the web service provider 25. After receiving the offer from the web service provider 25, the media player 20 presents this offer to the user at step 320.

The user may accept or reject to offerings from the web service provider 25 at decision step 322. If the user rejects the offering, the media player does not play the enhanced media portion (step 324). If the user accepts the offering, the media player 20 sends credit/debit card information to the web service provider 25 at step 326. Alternatively, the user may send certificate IDs, coupon IDs, or any other information that the web service provider 25 and content owner have agreed is adequate exchange for the authorization to play the enhanced content on the enhanced media 15.

Upon receipt of required information from the media player 20 to complete the transaction, the web service provider 25 returns an encrypted content 220 key, $K_n$, at step 328. The broadcast decryption module 235 of the media player 20 processes the media key block 205 to obtain the media key at step 330 (FIG. 3C). From that, the media player 20 can calculate the disc unique key. The broadcast decryption module 235 then uses the derived disc unique key at step 332 to decrypt the encrypted content 220 key, $K_n$, obtaining the content key 225 required to play the enhanced content on the enhanced media 15.

The verification module 240 of the media player 20 then verifies that the special files 215 have not been modified at step 336. Without the required verification of the special files 215, an adversary or hacker might, for example, modify the special files 215 containing the URL of the web content provider 25. The hacker might then be able to authorize playing of premium enhanced content either for free, or diverting payments for premium enhanced content from the content owner to the hacker. Verifying the special files 215 at step 336 ensures that the files comprising the URL of the web service provider 25 have not been corrupted or modified.

If the special files 215 have been modified (decision step 338), an error in the enhanced media 15 has occurred. If the media player 20 determines that an error is due to errors originating from the enhanced media 15 or the web service center 20, the media player 20 follows the "key error" path in the navigation of the enhanced media 15 at step 340. Content owners may provide such a path to point the user to technical support.

Once the web service provider 25 has obtained the necessary fees or information and the secret files have been verified, the transaction is complete. The media player 20 may then play the enhanced content on the enhanced media 15 (step 342). The use of the media key block 205 in the context of broadcast encryption allows the method 300 to proceed securely without an exposure of a system due to a global secret ID or the difficulties of a system using a public/private handshake.

Figure 4:
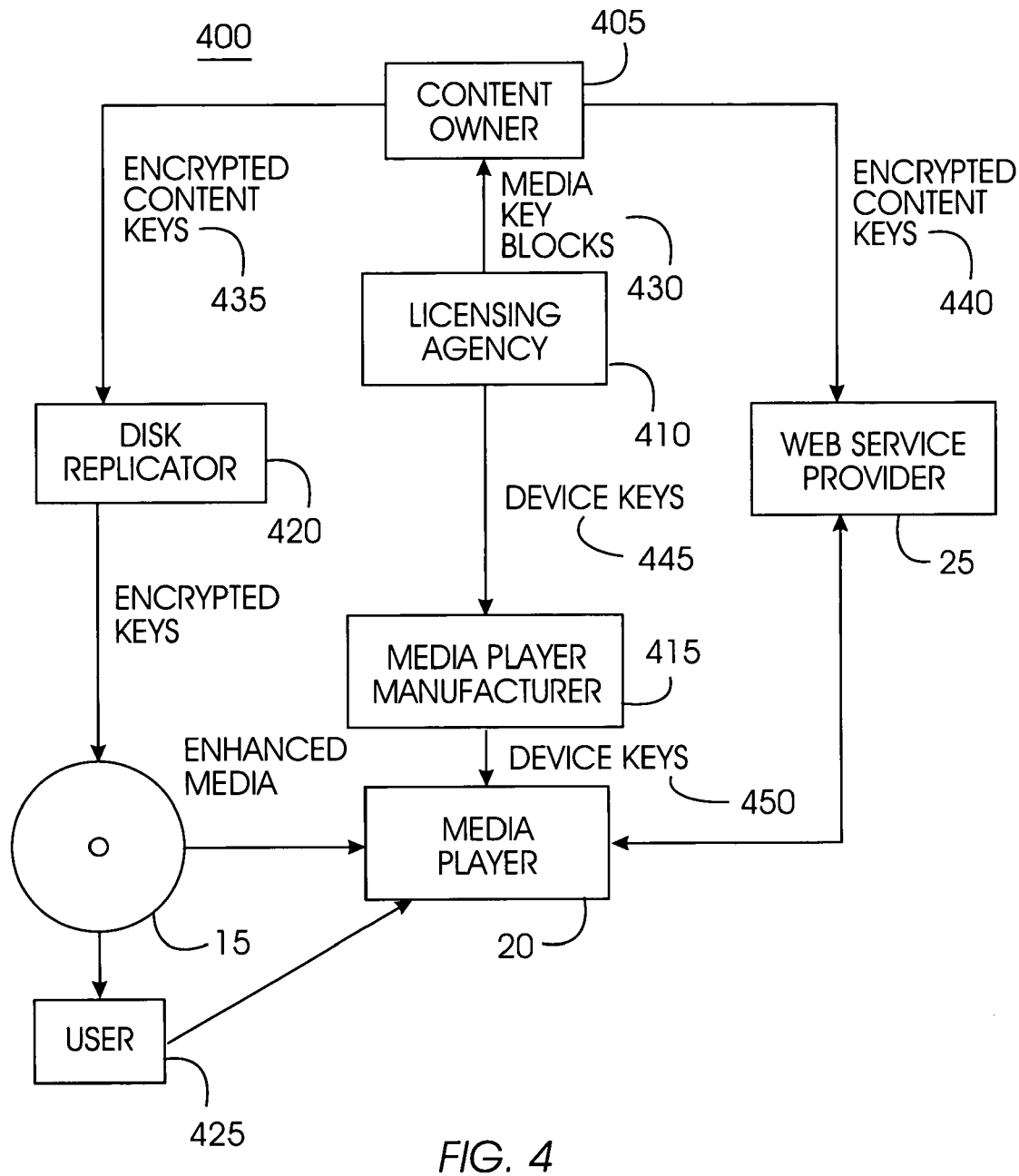
FIG. 4 is a block diagram of the high-level architecture of a content distribution system for enhanced media using an enhanced media system of FIGS. 1 and 2.

The media player 20, web service provider 25, and enhanced media 15 operate within the context of a content distribution model 400, illustrated by the block diagram of FIG. 4. The content distribution model 400 comprises the content owner 405, the licensing agency 410, the media player manufacturer 415, the disc replicator 420, the web service provider 25, and the user 425. The licensing agency 410 manages content licenses for the content owner 405. As such, the licensing agency 410 provides a set of media key blocks 430 to the content owner 405 for encryption of content on enhanced media 15. The content owner 405 uses the media blocks 205 to encrypt content keys. Encrypted content keys 435 for content that does not require interaction with the web service provider 25 are imbedded in the content provided to the disc replicator 420. Encrypted content keys 440 are provided to the web service provider 25 for content that requires interaction with the web service provider 25.

The licensing agency 405 provides a set of device keys 445 to the media player manufacturer 415. The device keys 445 provided to the media player manufacturer 415 represent a license from the content owner 405 allowing the media player 20 manufactured by the media player manufacturer 415 to play content produced by content owner 405. The media player manufacturer 415 provides a subset of device keys 450 from the set of device keys 445 to each media player 20. The media player 20 uses the device keys 450 to decrypt the media key block 205.

Figure 5A:
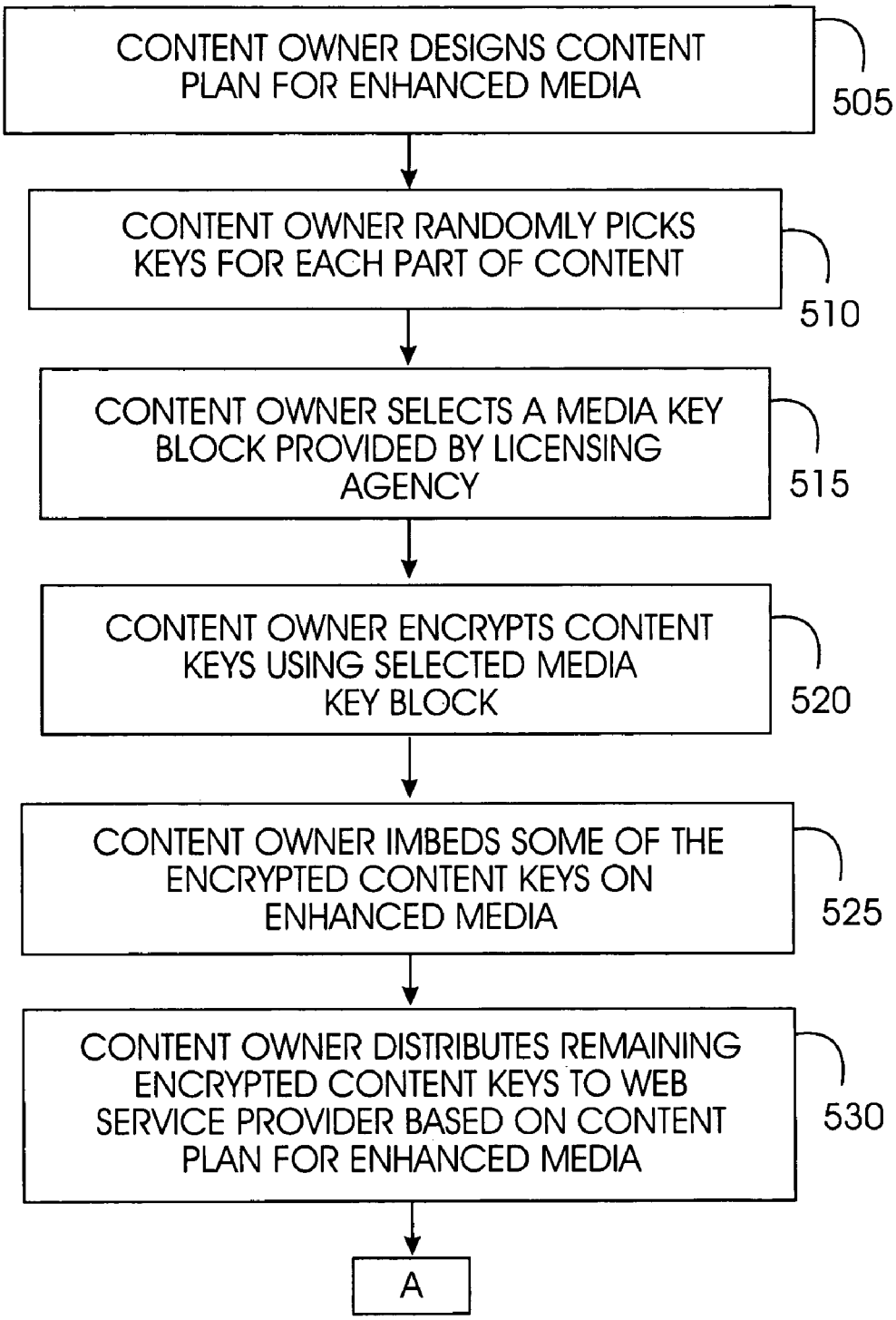
FIG. 5 is a comprised of FIGS. 5A and 5B, and represents a process flow chart illustrating a method of creating and distributing enhanced media utilizing the enhanced media system of FIGS. 1 and 2.
Figure 5B:
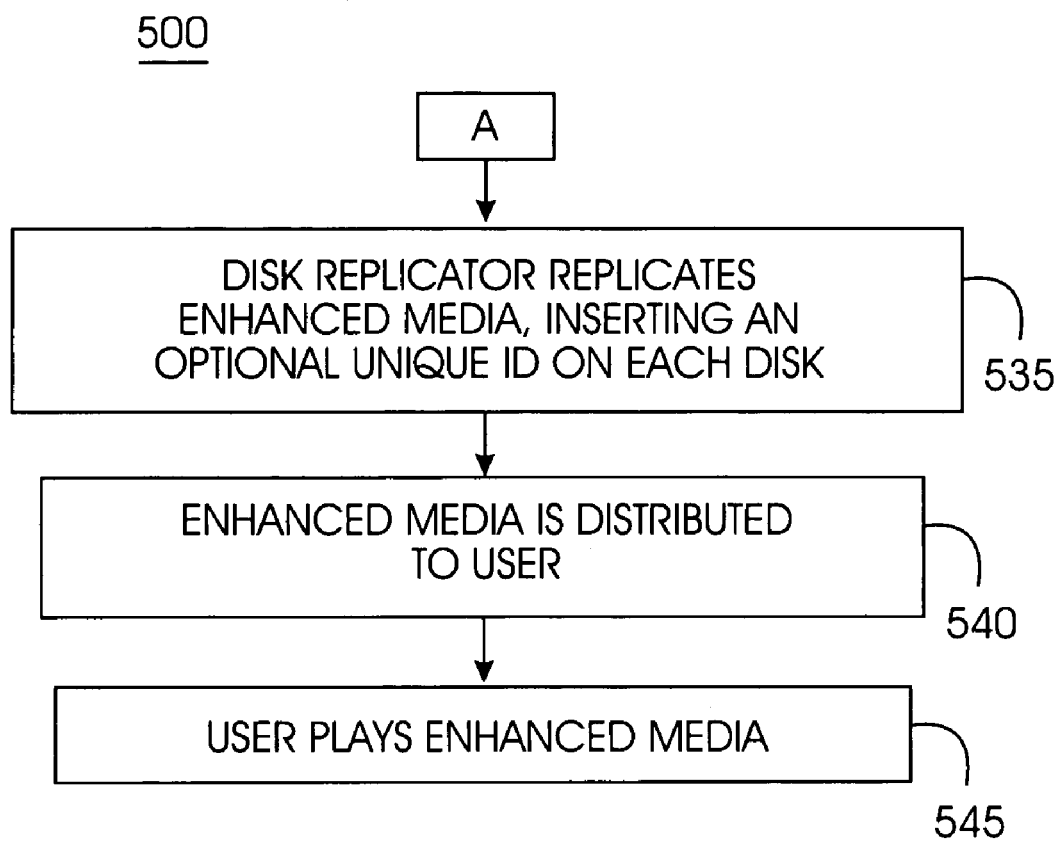

FIG. 5 (FIGS. 5A, 5B) illustrates a method 500 for encrypting and distributing content by the content owner. The content owner 405 designs a content plan for a production of enhanced media 15 at step 505. The content owner 405 creates the content and divides it into different parts. The content owner 405 also, for example, determines which parts of the content are provided for the purchase price of the enhanced media 15 and which parts are features that either require additional fees or interaction with the web service provider 25.

The content owner 405 randomly picks content keys for each part of the content on the enhanced media 15 at step 510. At step 515, the content owner 405 selects a media key block 205 from the set of media key blocks 430 provided by the licensing agency 410. The content owner 405 encrypts the content keys for the content on the enhanced media 15 using the media key block 205 at step 520.

The content owner 405 places some of the encrypted content keys 435 on the enhanced media 15 at step 525. The media player 20 may play content encrypted by encrypted content keys 435 without contacting the web service provider 25. The remaining encrypted content keys 440 are provided to the web service provider 525 at step 530 to exchange with the user 425, for example, for fees or information.

The disc replicator 420 replicates the enhanced media 15 at step 535 (FIG. 5B) and optionally inserts a unique ID on each enhanced media 15. Enhanced media 15 is then distributed to users such as user 425 at step 540 through, for example, sales or promotional events. The user 425 plays enhanced media 15 on the media player 20 at step 545. Processing for the enhanced media 15 proceeds as described by method 300 of FIG. 3.

FIG. 6 (FIGS. 6A, 6B, 6C, 6D, 6E) is a process flow chart illustrating an exemplary method 600 of communication between the media player 20 and the web service provider 25. The user 425 views a menu presented by enhanced media 15, agrees with the price noted in the menu for a particular piece of enhanced content and asks the media player 20 to play that piece of content. The media player 20 finds that the content key for that section is not in the cache of the media player 20 at step 602. The media player 20 then locates the record for the desired content key in the enhanced.keys file at step 604.

The media player determines whether the content key is marked "deferrable" at decision step 606. If the content key is not marked "deferrable", the media player 20 connects to the Internet at step 608. The media player 20 then performs an HTTPS POST to the web service provider 25 at the URL found in the record for the content key (step 610).

In this example, the post data that the media player 20 sends to the web service provider 25 is the following format, in readable ASCII:

```
key=<n>
titleId=<titleId>
[mediaId=<mediaId>]
media player 20Id=<media player 20Id>
[language=<language>]
[price=<price>
creditCard=<nnnnnnnnnnnn>
expires=<mm/yy>
cardHolder=<first last>
billingAddress=<billing address>
billingZip=<zip>]
```

The price and credit card information are omitted if the content key does not have a price in the enhanced.keys file. The media ID line is omitted if the enhanced media 15 does not have a unique media ID. The "language" line may be omitted.

If the user 425 has expressed a language preference to the media player 20, the media player 20 can use the "language" line to communicate that preference to the web service provider 25. The web service provider 25, in turn, may use that preference to format potential error messages. In this example, the language is denoted with the English name for the language, for example, "English", "Japanese", "Spanish", "Mandarin", etc.

The IDs are in readable hexadecimal, for example, with "a-f" in lower case. The price is copied from the appropriate line in the enhanced.keys file. The key number, credit card number, the zip code, the "mm", and the "yy" in the credit card expiration date are in readable decimal. Except for the name and billing address of the credit card holder, there are no white-space characters except for the ending line feed character. The billing address contains neither embedded carriage returns nor line feeds.

Figure 6A:
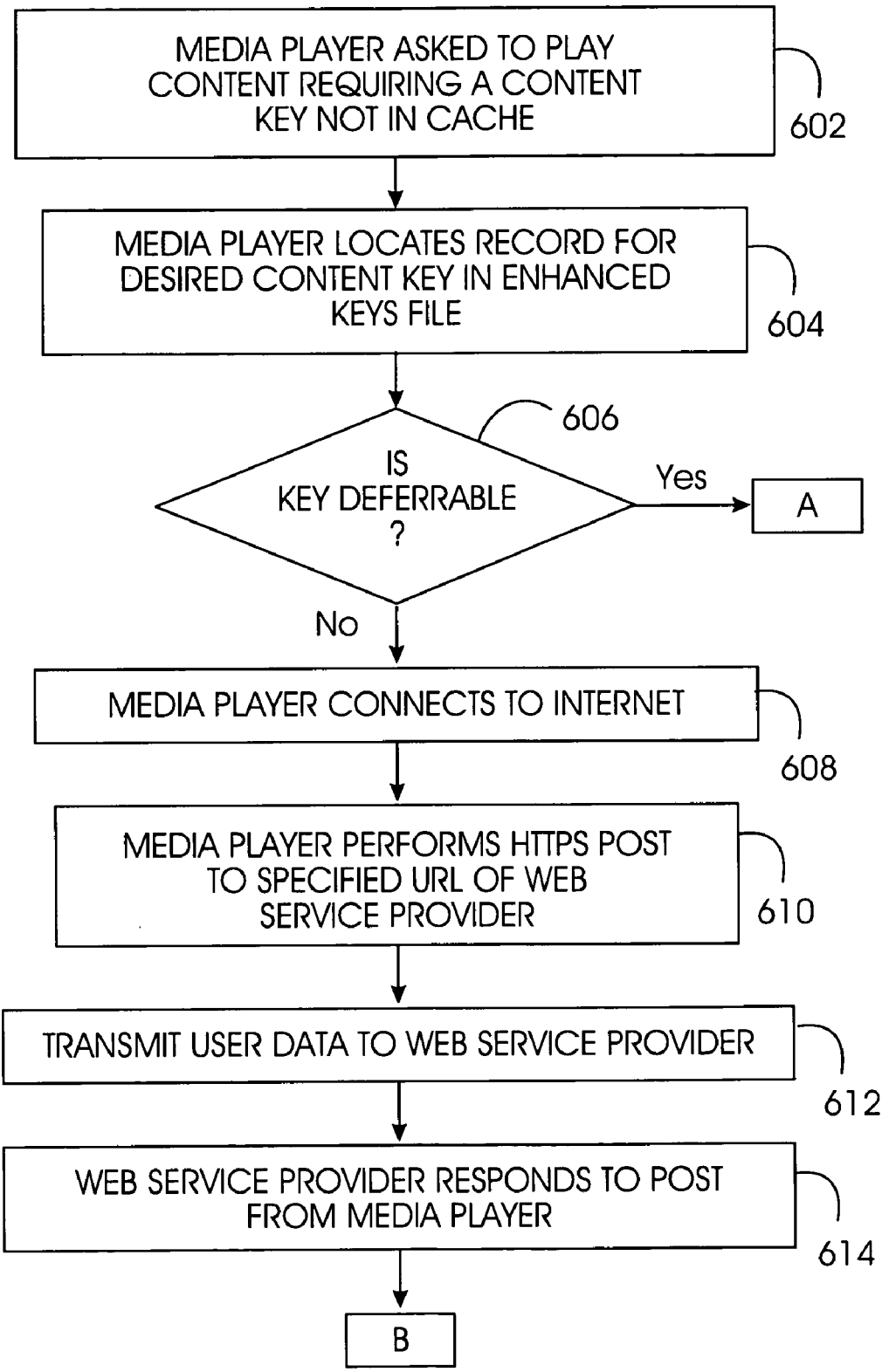
FIG. 6 is comprised of FIGS. 6A, 6B, 6C, 6D, and 6E, and represents a process flow chart illustrating a communication protocol between a web service provider and a media player utilizing the enhanced media system of FIGS. 1 and 2.
Figure 6B:
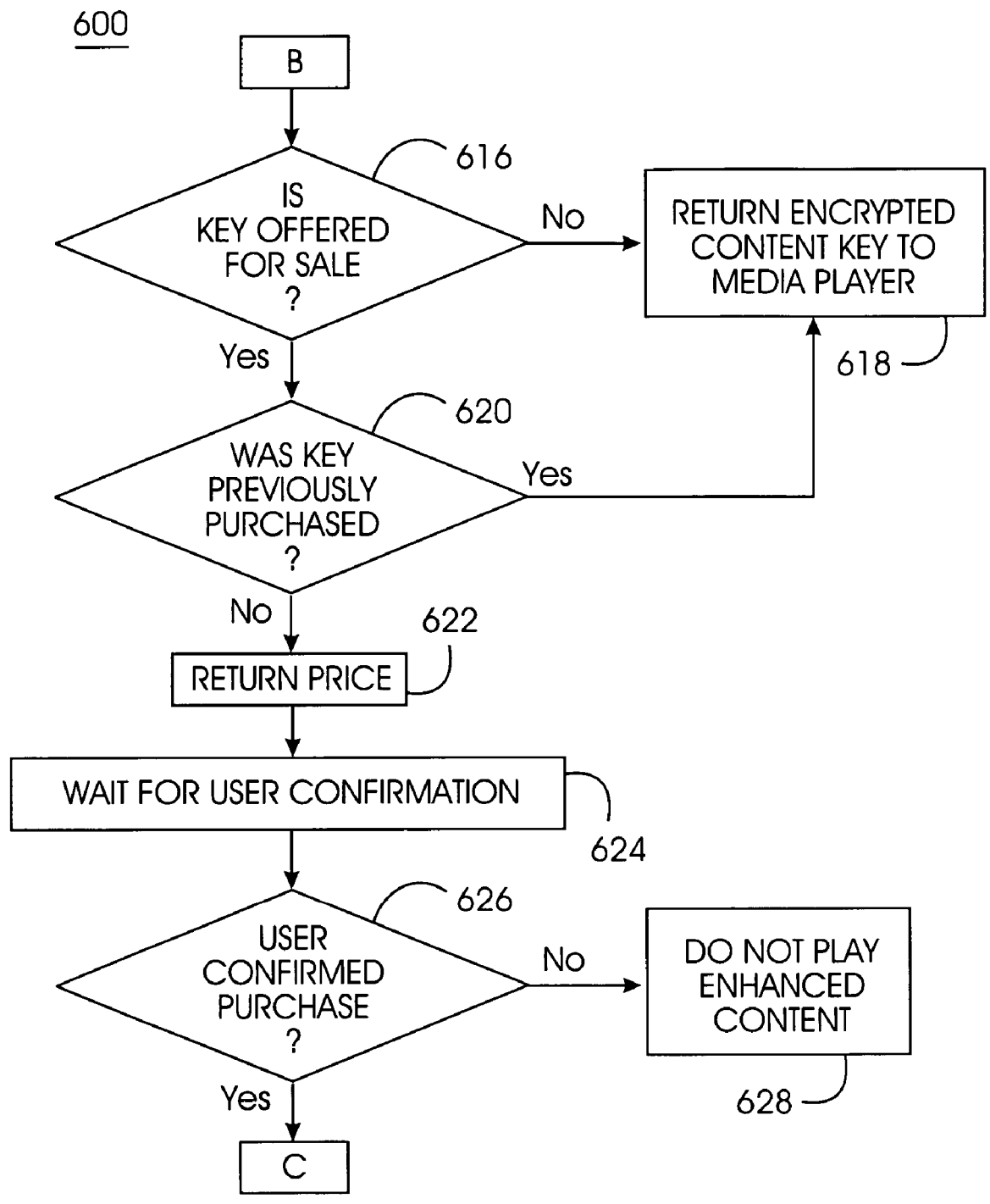

The web service provider 25 responds to the POST from the media player 20 at step 614. The web service provider 25 determines whether the content is offered for sale at decision step 616 (FIG. 6B). If not, the key is free, and the web service provider 25 returns the encrypted content key to the media player at step 618. The encrypted content key is given, for example, in readable hexadecimal, encrypted as "key=<$D_n$>\n".

The web service provider then determines at decision step 620 if user 425 previously purchased the encrypted content key, as might occur if the content key had fallen out of the cache of the media player 20. If so, the web service provider 25 transmits the key without demanding payment at step 618. However, web service provider 25 may use its own criteria in determining if a key has been previously purchased and can be given again for free. For example, web service provider 25 might use the media ID, the ID of the media player 20, the credit card of user 425, or some combination of these values.

Figure 6C:
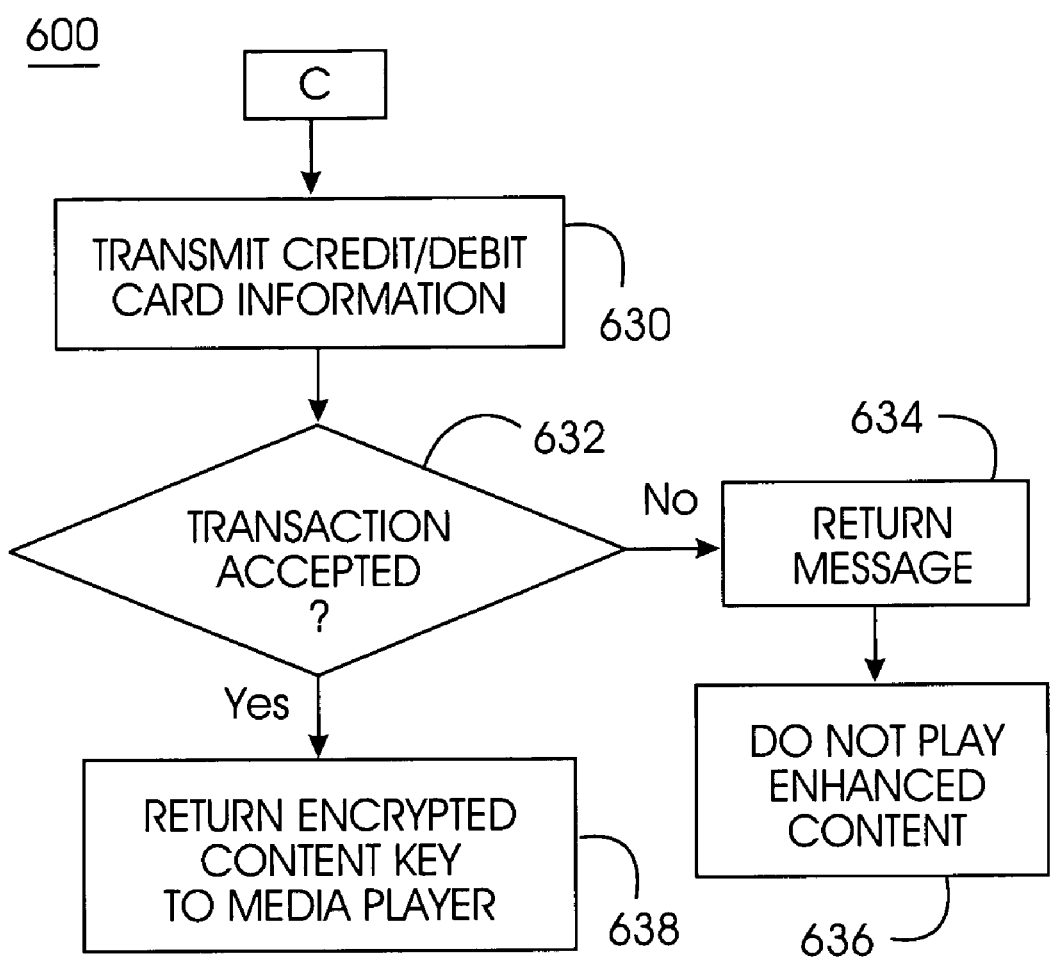
Figure 6D:
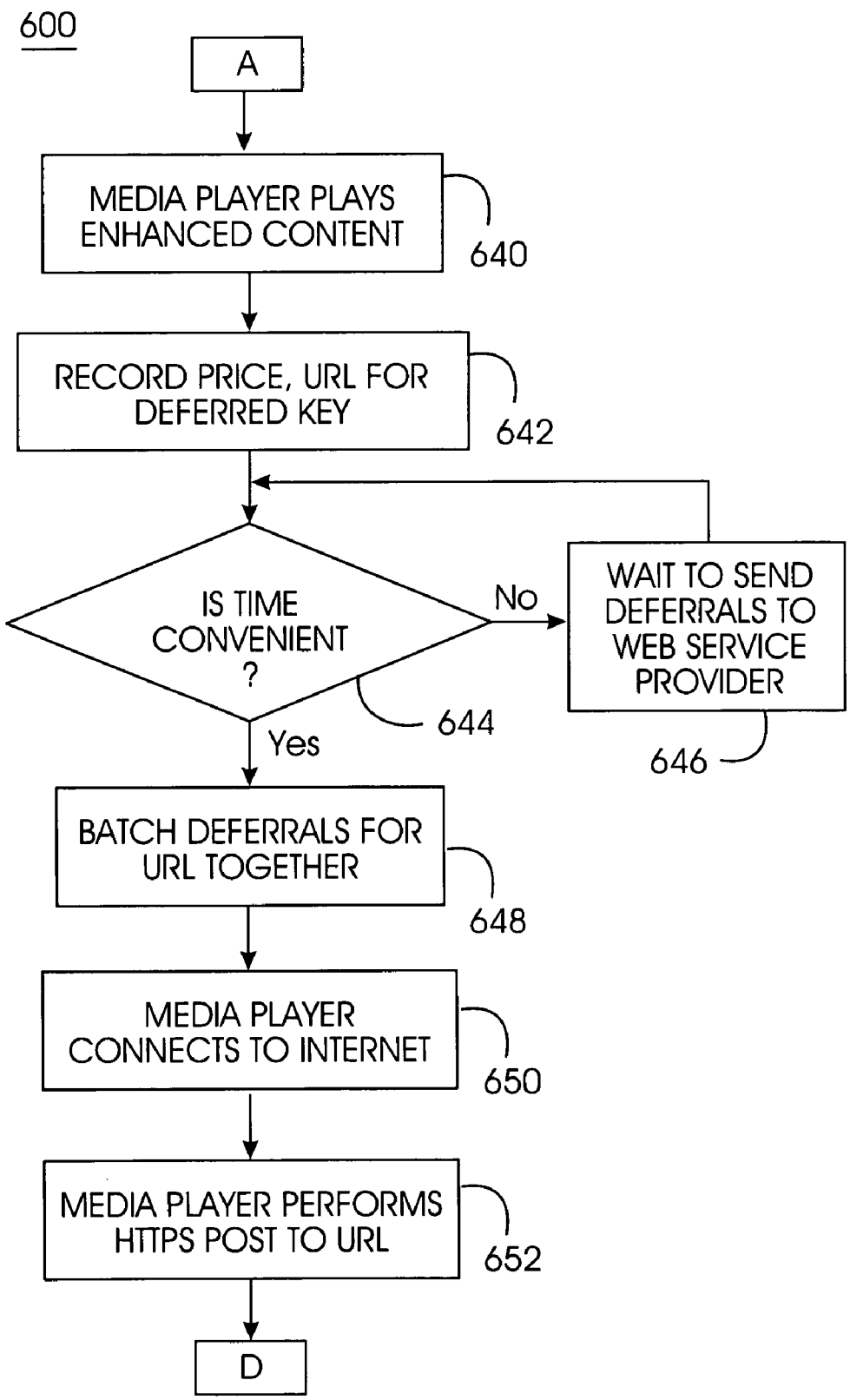

If the encrypted content key for the selected enhanced media has not been previously purchased (decision step 620), the media player 20 returns the price for the encrypted content key to the user 425 at step 622. The media player 20 then waits for confirmation from the user 425 before proceeding (step 624). If at decision step 626 the user does not confirm the purchase, the media player 20 does not play the enhanced content at step 628. If the user 425 confirms the purchase at decision step 626, the media player 20 shall repeat the transaction, this time transmitting the credit card information of user 425 at step 630 (FIG. 6C). The format for the price is the same as in the enhanced key file: "price=<price>\n".

Based on the credit/debit information transmitted by the media player 20, the web service provider 25 has the option of accepting or rejecting the transaction at decision step 632. If the transaction is rejected, the web service provider returns an explanatory message to the media player 20 such as "credit card is expired" at step 634. The media player 20 does not play the enhanced content at step 636. Unlike the ASCII responses from the web service provider 25 to the media player 20, explanatory responses are in Unicode. The method by which the media player 20 handles this response is specific to the media player 20. If the web service provider 25 accepts the transaction, the encrypted content key is returned to the media player at step 638.

If at decision step 606 the desired content key is a deferred key, the media player 20 can play the enhanced content immediately at step 640 (FIG. 6D); payment to the web service provider 25 for that enhanced content is deferred. The media player 20 records the price for the enhanced media and the URL associated with the deferred key at step 642. If the current time is not convenient for performing deferral transactions at decision step 644, the media player waits at step 646 for a time convenient to the media player 20 and the user 425. At a convenient time, the media player 20 batches together any other deferrals in a single post by concatenating the post data for the same URL at step 648.

Figure 6E:
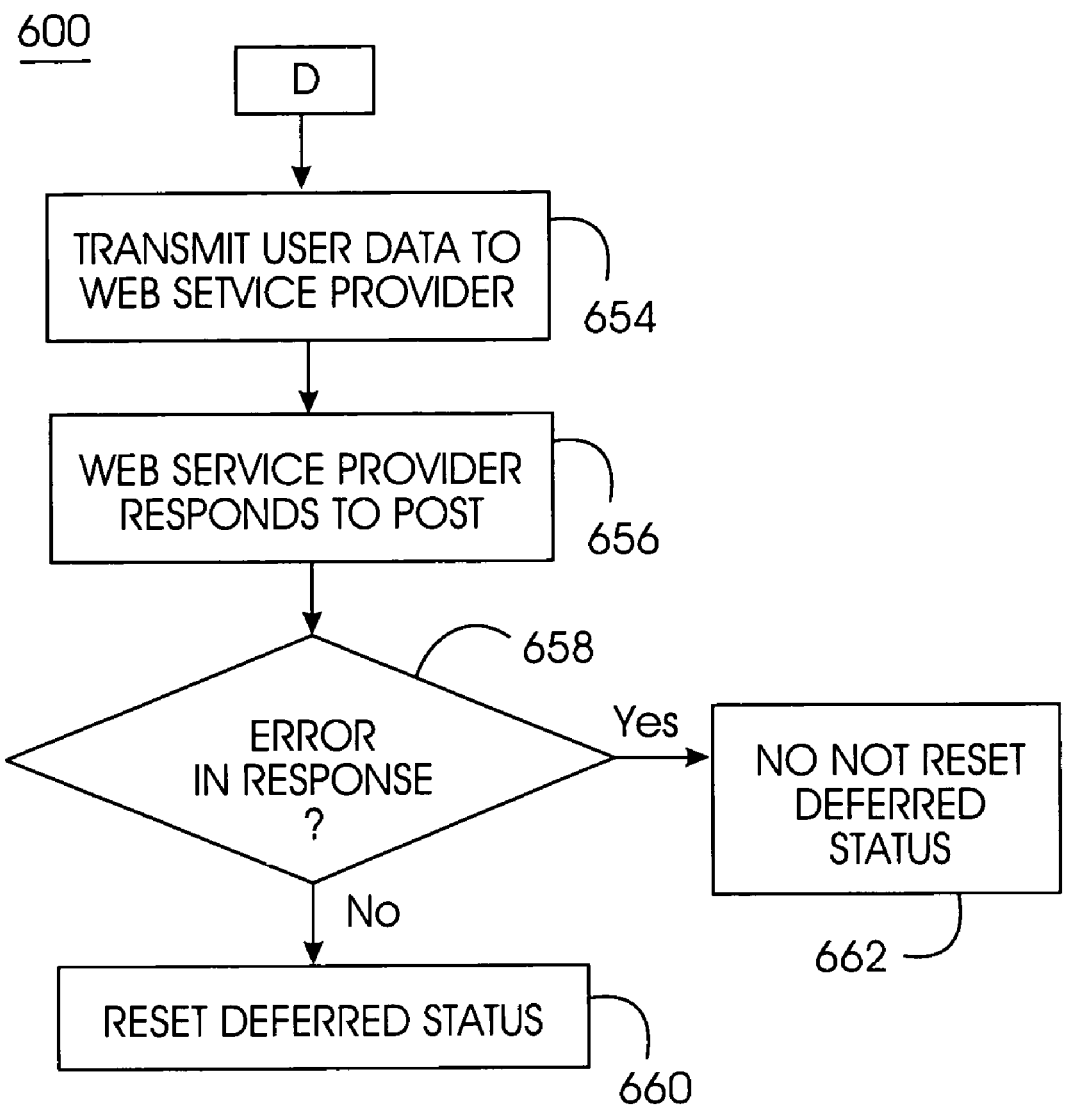

The media player 20 then connects to the Internet at step 650 and sends the HTTPS POST as before (step 652). The media player 20 transmits data from user 425 to the web service provider 25 at step 654 (FIG. 6E). The web service provider 25 responds to the post at step 656. If deferrals have been batched together, the web service provider 25 likewise concatenates the responses to the media player 20 (step 656).

If no error occurs in the response at decision step 656, the web service provider 25 has returned the normal response, "key=<$D_n$>". This response causes the media player 20 to reset the deferred status of the deferred key. At step 660. If a web service provider 25 responds to a free deferred key request with the "price=" response, this is a web service provider 25 error at decision step 658. Consequently, the media player 20 shall treat this response as if a "key=" response was received, and reset the deferred status of the deferred key. If any other error occurs in the response, the media player 20 shall not reset the deferred status of the key at step 662.

The media player 20 determines response to errors if there is a syntax error in any of the required files or if any other error occurs with one exception. If the media player 20 calculates a deferred key, but is unable to decrypt successfully using that deferred key, the media player 20 shall delete this instance from its current deferred key storage.

It is to be understood that the specific embodiments of the invention that have been described are merely illustrative of certain applications of the principle of the present invention. Numerous modifications may be made to a system, method, and service for delivering enhanced multimedia content on physical media described herein without departing from the spirit and scope of the present invention. Moreover, while the present invention is described for illustration purpose only in relation to the WWW, it should be clear that the invention is applicable as well to, for example, to an intranet, a wide area network, or any other network in which devices may interconnected for communications purposes.

What is claimed is:

1. A method for delivering multimedia content on a physical media, comprising:
    placing at least one media key block on the physical media;
    dividing the multimedia content on the physical media into multiple parts;
    randomly selecting content keys corresponding to each part of the multimedia content;
    encrypting the parts of the multimedia content with corresponding content keys;
    selecting a media key block from a set of media key blocks;
    encrypting the corresponding content keys with the media key block; and
    delivering the encrypted corresponding content keys to a player of the physical media, wherein a subset of the encrypted corresponding content keys are embedded on the physical media, and wherein at least one of the encrypted corresponding content keys not in the subset are distributed using a web service provider and are not embedded on the physical media;
    wherein the physical media includes a physical media unique key encrypted in each of the content keys such that (a) a media key obtained from the media key block is combined with a volume identifier (ID) for the physical media using a cryptographic hash to provide the physical media unique key, and the physical media unique key is then encrypted in each of the corresponding content keys; or (b) wherein the physical media unique key is the media key; and wherein at least one of the encrypted content keys embedded on the physical media comprises a deferred key, in that content associated with the deferred key may be played without contacting the web service provider, thereby establishing a credit transaction with respect to the viewing of the content associated with the deferred key.

2. The method of claim 1, wherein delivering the encrypted corresponding content keys comprises delivery over a network.

3. The method of claim 1, wherein the encrypted corresponding content keys are associated with a price related to the use of the parts of the multimedia content.

4. The method of claim 3, further comprising delivering the price concurrently with the encrypted corresponding content keys.

5. The method of claim 4, further comprising determining the price when the encrypted encryption key is delivered.

6. The method of claim 3, further comprising associating the encrypted corresponding content keys with a maximum price.

7. The method of claim 6, further comprising preventing playback of the part if the maximum price is reached.

8. The method of claim 2, wherein the delivery over the network involves a secure protocol; and further comprising placing necessary data for the secure protocol on the physical media.

* * * * *